US007849945B2

(12) United States Patent
Ross, VII et al.

(10) Patent No.: US 7,849,945 B2
(45) Date of Patent: Dec. 14, 2010

(54) MODULAR ELECTRIC POWERTRAIN FOR A VEHICLE

(75) Inventors: Edwin Stuart Ross, VII, Torrance, CA (US); Damon Schell, Redondo Beach, CA (US)

(73) Assignee: Honda Motor Co., Ltd, Tokyo (JP)

( * ) Notice: Subject to any disclaimer, the term of this patent is extended or adjusted under 35 U.S.C. 154(b) by 1045 days.

(21) Appl. No.: 11/361,556

(22) Filed: Feb. 24, 2006

(65) Prior Publication Data
US 2007/0199748 A1 Aug. 30, 2007

(51) Int. Cl.
B60K 1/00 (2006.01)
B60K 1/02 (2006.01)
B60K 31/00 (2006.01)

(52) U.S. Cl. .................. 180/65.51; 180/65.1; 180/308; 180/197; 180/212

(58) Field of Classification Search ................ 180/65.1, 180/65.51, 252, 253, 308, 65.6, 6.48, 197, 180/212, 228
See application file for complete search history.

(56) References Cited

U.S. PATENT DOCUMENTS

| | | | | | |
|---|---|---|---|---|---|
| 676,965 | A | * | 6/1901 | Sachs | .......................... 318/139 |
| 1,346,520 | A | * | 7/1920 | Overton | ...................... 362/286 |
| 3,286,602 | A | * | 11/1966 | Butner et al. | ................... 92/28 |
| 3,370,668 | A | * | 2/1968 | Goodacre | .................... 180/253 |
| 3,444,946 | A | * | 5/1969 | Waterbury | ................... 180/2.2 |
| 3,730,287 | A | * | 5/1973 | Fletcher et al. | .............. 180/6.5 |
| 3,792,742 | A | | 2/1974 | Mager | |
| 4,461,367 | A | * | 7/1984 | Eichinger et al. | ........... 180/252 |
| 4,476,954 | A | * | 10/1984 | Johnson et al. | ............. 180/333 |
| 4,913,258 | A | | 4/1990 | Sakurai et al. | |
| 5,058,016 | A | * | 10/1991 | Davidovitch | ................. 701/22 |
| 5,067,932 | A | | 11/1991 | Edwards | |
| 5,082,082 | A | | 1/1992 | Hvolka | |
| 5,164,903 | A | | 11/1992 | Lin et al. | |
| 5,193,632 | A | * | 3/1993 | Clar et al. | ..................... 180/9.1 |
| 5,225,744 | A | | 7/1993 | Ishikawa et al. | |
| 5,236,055 | A | * | 8/1993 | Legal | ....................... 180/65.51 |
| 5,343,974 | A | | 9/1994 | Rabek | |
| 5,365,431 | A | * | 11/1994 | Minezawa et al. | ............ 701/22 |
| 5,418,437 | A | | 5/1995 | Couture et al. | |
| 5,818,134 | A | * | 10/1998 | Yang et al. | .................... 310/78 |
| 5,848,659 | A | | 12/1998 | Karg et al. | |
| 5,894,902 | A | | 4/1999 | Cho | |
| 5,947,855 | A | | 9/1999 | Weiss | |

(Continued)

FOREIGN PATENT DOCUMENTS

JP 05260606 A * 10/1993

(Continued)

Primary Examiner—J. Allen Shriver, II
Assistant Examiner—Chiedu A Chibogu
(74) Attorney, Agent, or Firm—Gregory J. Burke; Michael A. Forhan; Eley Law Firm Co.

(57) ABSTRACT

A powertrain module for a vehicle. The powertrain module comprises a support member. An energy source is disposed within the support member. A motor-driven wheel is rotatably attached to the support member and coupled to the energy source, and a tire is mounted to the motor-driven wheel. The powertrain module is configured to be attached as a unit to a corner portion of a vehicle to provide the vehicle with motive power.

20 Claims, 4 Drawing Sheets

U.S. PATENT DOCUMENTS

| | | | |
|---|---|---|---|
| 6,318,743 B1 * | 11/2001 | Nakashima et al. | 280/152.1 |
| 6,688,412 B2 * | 2/2004 | Kima et al. | 180/65.51 |
| 6,802,385 B2 | 10/2004 | Pyntikov et al. | |
| 6,840,825 B1 | 1/2005 | Messano | |
| 6,845,839 B2 | 1/2005 | Chernoff et al. | |
| 6,851,496 B2 | 2/2005 | Prucher | |
| 6,909,959 B2 * | 6/2005 | Hallowell | 701/88 |
| 7,100,722 B2 * | 9/2006 | Bowen | 180/65.51 |
| 7,465,329 B2 * | 12/2008 | Oshima | 55/385.3 |
| 7,594,561 B2 * | 9/2009 | Hass et al. | 180/299 |
| 7,789,175 B2 * | 9/2010 | Tobey et al. | 180/65.1 |
| 2003/0132584 A1 * | 7/2003 | Borroni-Bird et al. | 280/5.5 |
| 2004/0200347 A1 * | 10/2004 | Grosch | 89/36.09 |
| 2004/0263099 A1 * | 12/2004 | Maslov et al. | 318/254 |

FOREIGN PATENT DOCUMENTS

| | | |
|---|---|---|
| JP | 07267172 A * | 10/1995 |
| JP | 2002137764 A * | 5/2002 |
| WO | WO 9819875 A1 * | 5/1998 |

* cited by examiner

MODULAR ELECTRIC POWERTRAIN FOR A VEHICLE

FIELD

The present invention relates generally to electrically motorized vehicles, in particular electric powertrains for vehicles.

BACKGROUND

Vehicles that utilize a battery as an energy source and a motor as a drive source, commonly referred to as electric vehicles, have become increasingly attractive in recent years due to their low pollution emissions, low noise, and reduced energy expense as compared to vehicles having internal combustion engines. The conventional electric vehicle utilizes axles upon which wheels and motors are mounted, along with power transmission devices such as a reduction gear and a differential gear. A drawback of such configurations is vehicle weight and power transmission efficiency, consequently increasing the vehicle's energy consumption and decreasing the vehicle's traveling distance between battery re-chargings (referred to as "range"). The relatively short range of electric vehicles has prevented them from finding widespread acceptance.

Some electric vehicles use a direct-drive type motor that is coupled to the wheels, eliminating the need for power transmission devices such as a reduction gear, a differential gear, a drive shaft, etc., thereby improving the efficiency of power transmission and decreasing the weight of the vehicle. These direct-drive type motor wheels, which directly transmit the motor torque to the wheels, fall under two types. A first type is configured such that the wheels are mechanically interlocked with the motor, while a second type is configured such that the motors are incorporated into the wheels.

Although the direct-drive motor represents an improvement in electric vehicle designs, the motor, power supply, and various ancillary elements, such as suspension components are typically individually attached to the vehicle. As a consequence, automobile designers are obliged to custom-develop powertrain and suspension configurations that are suitable for at most only a few vehicle designs. This results in more design labor and development testing for new vehicle designs than is desirable, since this effort drives up the cost of the vehicle and increases the amount of time needed to bring it to market. Once in service, the individually-attached devices can be expensive and labor-intensive to repair or replace in the event of a failure or damage.

Another drawback of current electric vehicles is that a considerable amount of space which could otherwise be utilized for cabin space is consumed by the drive train and suspension. It is desirable to increase the amount of cabin space in order to provide a more comfortable environment for the passengers and/or more cargo space.

Yet another drawback of current electric vehicle designs is that the batteries are typically located some distance from the motor or motors. Consequently, there can be a significant voltage drop in the power lines extending between the batteries and the drive motors, resulting in reduced vehicle performance and wasted energy.

There is a need for a powertrain and suspension system for electric vehicles that provides for efficient reconfiguration of vehicle designs, more cabin space, reduced repair cost, and reduced energy losses.

SUMMARY

The present invention is a modular powertrain for an electric vehicle, each module being attached to a corner portion of a frame. The modules include drivetrain components that eliminate the need for an engine bay and thus allow for increased usable space in the cabin.

Each module comprises an independent suspension, a motor-driven-wheel, one or more batteries or other form of energy source, and structural members necessary to attach the module to an external corner of the vehicle's frame. Each module is self-sufficient in that it can independently act to support the vehicle, provide motive power, and provide steering or maneuvering capability. The modules may be linked together as elements of a control system but are designed to be manufactured individually and be individually replaceable if any of them malfunction or are damaged.

An aspect of the present invention is a powertrain module for a vehicle. The powertrain module comprises a support member. An energy source is disposed within the support member. A motor-driven wheel is rotatably attached to the support member and coupled to the energy source, and a tire is mounted to the motor-driven wheel. The powertrain module is configured to be attached as a unit to a corner portion of a vehicle to provide the vehicle with motive power.

Another aspect of the present invention is a plurality of powertrain modules for a vehicle. Each module comprises a support member. An energy source is disposed within each support member. A motor-driven wheel is rotatably attached to the support member and coupled to the energy source, and a tire is mounted to the motor-driven wheel. The powertrain modules are configured to be attached as a unit to each corner portion of a vehicle to provide the vehicle with motive power. A controller is electrically coupled to the powertrain modules to control operation of the powertrain modules in a cooperative manner.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
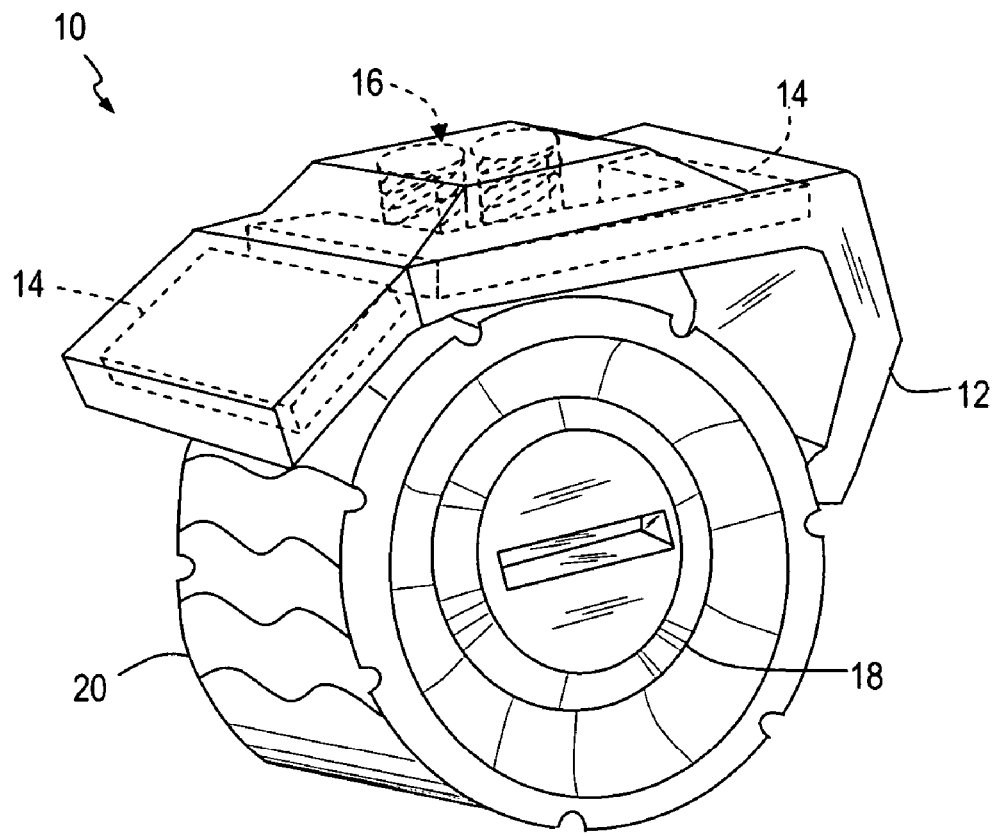
FIG. 1 depicts the general arrangement of a powertrain module according to an embodiment of the present invention.

The general arrangement of an electric powertrain module 10 is shown in FIG. 1, according to an embodiment of the present invention. Powertrain module 10 comprises a support member 12, one or more energy sources 14 disposed within the support member, a suspension 16, a motor-driven wheel 18 rotatably attached to the support member, and a tire 20 mounted to the motor-driven wheel.

Figure 2:
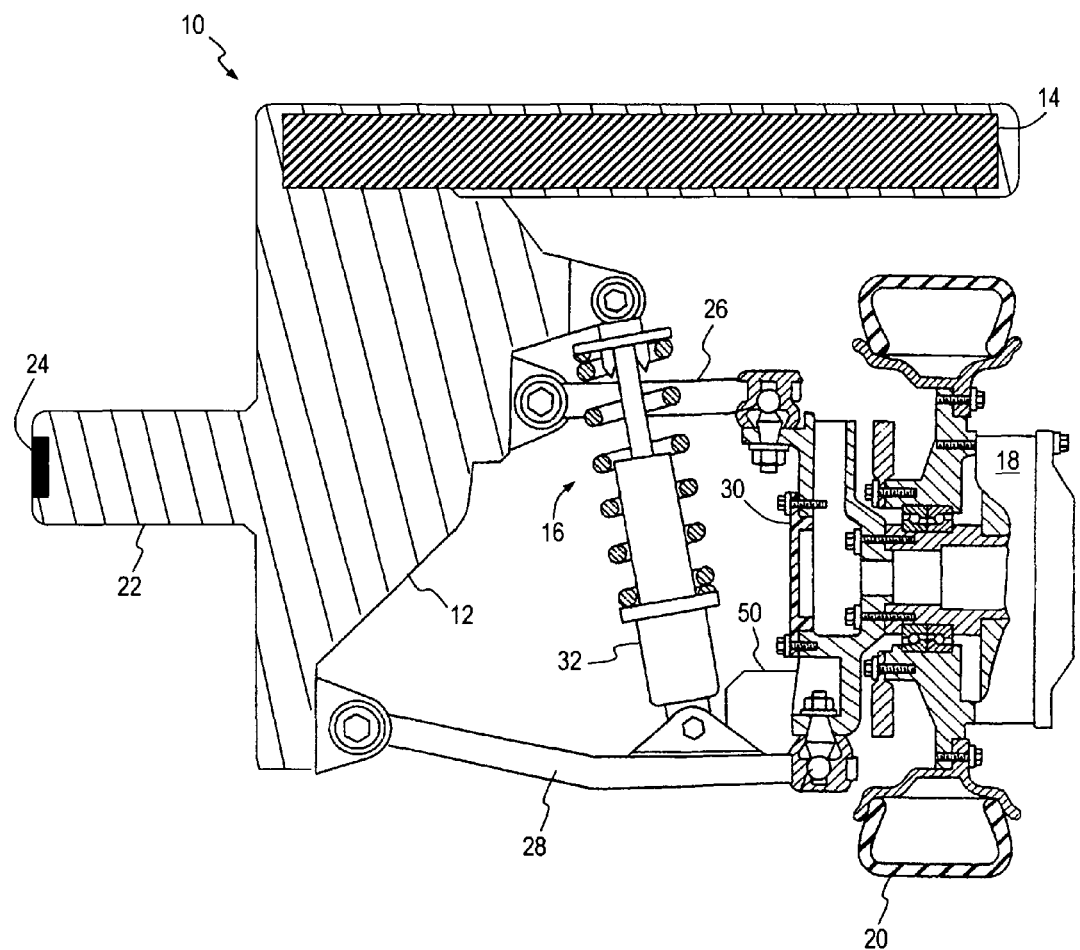
FIG. 2 is a view in section of a powertrain module according to an embodiment of the present invention.

With continued reference to FIG. 1, a view in section of powertrain module 10 is shown in FIG. 2. Support member 12 is shaped to form a portion of the exterior of a vehicle, such as a fender portion. In addition, support member 12 acts as a framework to which the components of powertrain module 10 are attached. A mounting portion 22 is shaped to couple to a corresponding receptacle on a vehicle, thus providing an efficient way to quickly install and remove powertrain module 10 from a vehicle. An electrical connector 24 attached to mounting portion 22 provides a detachable interface between powertrain module 10 and the vehicle. Interface connections may include energy sources 14, motor-driven wheels 18, and a vehicle controller 40 and associated sensors, discussed below. Support member 12 may be made from any suitable materials alone or in combination including, without limitation, metals, plastics, fiberglass and carbon-fiber composites, and may be fabricated by any suitable techniques such as, for example, molding, casting, machining and composite lay-up.

Energy sources 14 are batteries or other power sources of a type, voltage and amp-hour rating suitable for supplying power to motor-driven wheel 18. Example types of batteries may include, without limitation, lead-acid, Nickel-Metal Hydride (NiMH), Nickel-Cadmium (NiCad) and Lithium Ion (Liuon), and may be constructed using flooded, sealed, gelled, and Absorbed Glass Mat (AGM) configurations. Energy sources 14 are configured to be attached to, and disposed within, support member 12. Energy sources 14 may further comprise non-battery energy sources, such as photovoltaic panels mounted to an exterior surface of support member 12 or remotely located on the vehicle. Additional energy sources may include utilizing motor-driven wheel 18 as a regenerative brake, and power supplied by any external or remote power source. In fact, energy sources 14 may be any technology now known or later developed that is capable of generating and/or storing energy.

In the embodiment shown in FIGS. 1 and 2, suspension 16 comprises an upper arm 26 and a lower arm 28, an end of each being pivotably attached respectively to a steering knuckle 30. Motor-driven wheel 18 is in turn rotatably attached to knuckle 30. Some embodiments may delete knuckle 30, in which case suspension arms 26, 28 are pivotably attached to motor-driven wheel 18. The remaining ends of upper arm 26 and lower arm 28 are pivotably attached to support member 12. At least one shock absorber 32 is interposed between lower arm 28 and support member 12. It is to be emphasized that the configuration of suspension 16 described herein is merely illustrative of one example configuration of a suspension system. The present invention may, in fact, be used to advantage with any configuration of suspension now known or invented in the future, the primary criteria being that suspension system 16 is wholly contained by powertrain module 10.

Motor-driven wheel 18 may be any type of motor-in-wheel device suitable for the expected operating environment and performance requirements of an electric vehicle. Example configurations include those having the wheels mechanically interlocked with the motor and those having motors incorporated into the wheels. Motor-driven wheels are known in the art and are available from various sources including, without limitation, TM4 TRANSPORT, KORDEL ANTRIEB-STECHNIK GMBH, and SCHABMULLER, among others. Motor-driven wheel 18 may also function as a regenerative-type brake, acting as braking devices and generating energy to be provided to energy source 14 for storage.

Tire 20 may be any type of tire suitable for the expected operating environment and performance characteristics of the electric vehicle. Examples include solid, tube-type and tubeless tires. Tire 20 may also be a bias-ply or radial type, with any tread design suitable for the expected operating characteristics and environment of the electric vehicle.

Figure 3:
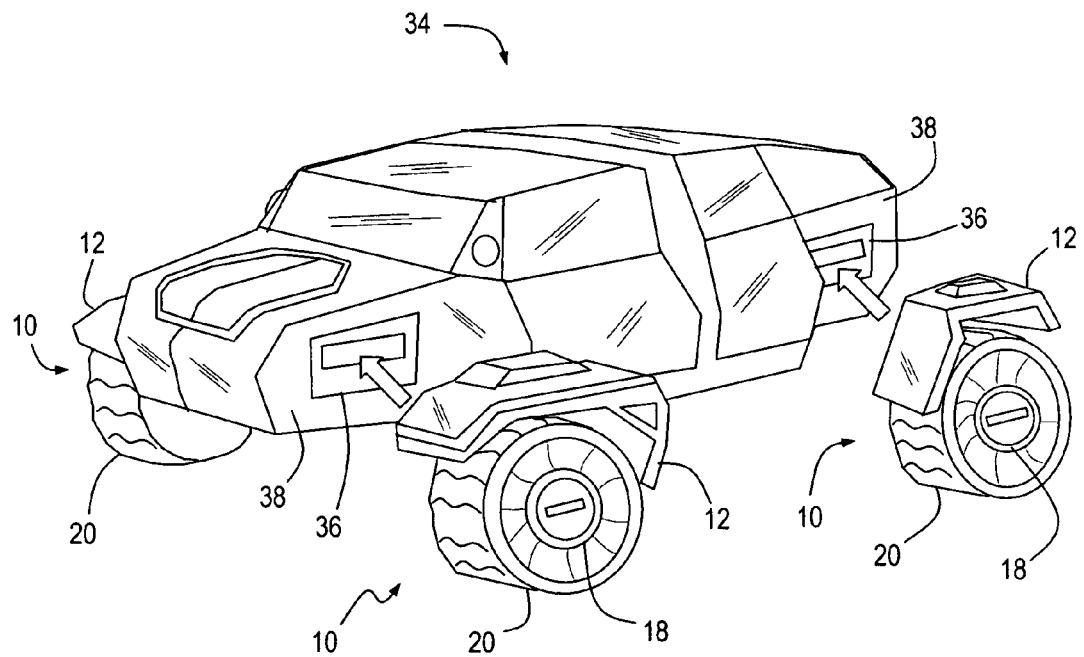
FIG. 3 depicts the powertrain module of FIG. 1 being assembled onto a vehicle.

The assembly of powertrain module 10 to a vehicle 34 is shown generally in FIG. 3. Vehicle 34 is configured with receptacles 36 at each corner portion 38, to which powertrain modules 10 are attached. To assemble powertrain module 10 to vehicle 34 the powertrain module is positioned such that the mounting portion 22 (FIG. 2) is aligned with receptacle 36. Power train module 10 is moved toward vehicle 34 such that mounting portion 22 engages receptacle 36. Once engaged, mounting portion 22 may be detachably held in place with threaded bolts of a suitable size and number or other suitable captive means, such as clamps, that join the mounting portion to the frame of vehicle 34.

Figure 4:
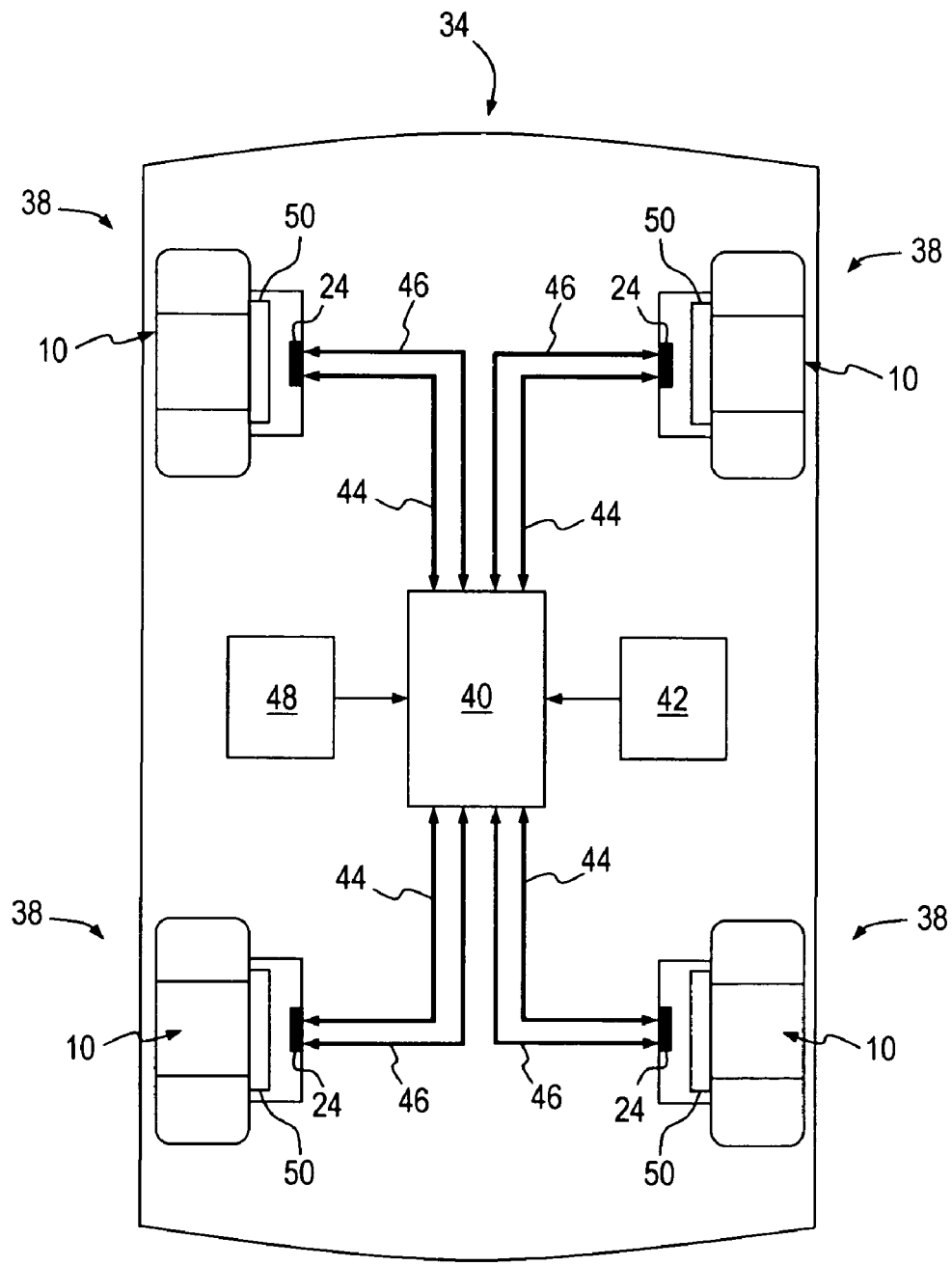
FIG. 4 is a schematic diagram of a vehicle incorporating powertrain modules according to an embodiment of the present invention.

With reference to FIGS. 1-3 collectively, a schematic diagram of vehicle 34 is shown in FIG. 4. As can be seen, a powertrain module 10 is located proximate one or more of corner portions 38 of vehicle 34. Each powertrain module 10 is electrically coupled to a controller 40, which can be configured to perform such functions as, without limitation, receiving control inputs 42 from the driver and various vehicle sensors, controlling the speed and torque of each motor-driven wheel 18, routing power between various energy sources 14, and detection and resolution of fault conditions. Controller 40 is thus electrically coupled to the powertrain modules 10 to control operation of the powertrain modules in a cooperative manner.

Controller 40 may be a digital microprocessor-based control unit configured to receive and process input signals 42 according to a predetermined control logic to provide control signals 44 for controlling the operation of motor-driven wheel 18. Alternatively, controller 40 may comprise other digital architectures utilizing, for example, a computer, microcontroller, programmable logic device and the like. The control logic of controller 40 may be defined by a set of predetermined instructions, such as a computer program or "fuzzy logic." In other embodiments of the present invention portions of controller 40 may be analog, such as an analog closed-loop control system. Controller 40 may be a separate, standalone component or made integral with (or distributed among) other vehicle control components, such as on-board computer controls and powertrain module 10. Input signals 42 and control signals 44 may be hard-wired to each powertrain module 10, or may be provided over a commonly-connected data link conforming to an industry standard protocol, such as SAE J1939 or the like. Input and control signals 42, 44 may be any of analog, digital and pulse width modulated signal formats.

With reference to FIGS. 1-4, a powertrain module 10 may be attached to selected corner portions 38 of vehicle 34, with each powertrain module electrically connected to controller 40 via control signals 44. Input signals 42 provided directly or indirectly by the vehicle operator, such as acceleration, braking, and steering signals, are received by controller 40. Controller 40 interprets the input signals in accordance with predetermined criteria, such as a computer program, and controls the operation of motor-driven wheels 18 of each powertrain module 10. In a first operational example, controller 40 may cause power from energy sources 14 to be coupled to respective motor-driven wheels 18 such that each wheel rotates to move vehicle 34 in either forward or reverse directions.

In a second operational example, controller 40 may disconnect one or more energy sources 14 from their respective motor-driven wheel 18 under certain conditions, such as when sufficient motive force can be supplied by the remaining powertrain modules 10. This will reduce the amount of energy consumed by vehicle 34.

In a third operational example, controller 40 may be configured as a traction control system to sense a loss of traction at one or more motor-driven wheels 18 and compensate for the loss of traction by commanding an increased amount of torque at the other powertrain modules 10.

In a fourth operational example, controller 40 may cause one or more powertrain modules 10 to act as a regenerative brake to slow or stop vehicle 34 and supply generated electrical energy to energy source 14. In some embodiments controller 40 may additionally function as an anti-lock brake and/or a dynamic stability control wherein the amount and distribution of torque produced by each powertrain module 10 is adjusted by the controller to minimize vehicle over steer or under steer through corners and maintain acceleration by preventing wheel spin on surfaces with uneven grip, for example where one driven tire 20 is on ice and another on tarmac.

In a fifth operational example, controller 40 may function as a power grid controller, transferring the available power between energy sources 14. In this way additional power can be supplied from energy sources 14 to particular powertrain modules 10 via a network of power lines 46, for example, if vehicle 34 is stuck in snow or mud. In such conditions controller 14 may transfer power from powertrain modules 10 that lack traction to those modules having traction, thereby providing greater motive force to free vehicle 34 from the mud or snow. Similarly, charging energy from regenerative braking of motor-driven wheels 18 and from other energy sources 14, such as photovoltaic cells 48, can be routed to powertrain modules 10 determined by controller 40 to need the energy, in predetermined proportions.

In a sixth operational example, input signals 42 may include a steering signal from the vehicle operator. The steering signal is generated by the operator through the use of a steering device (not shown), such as a steering wheel or joystick. The steering device includes means, such as transducers, to convert the mechanical position of the steering device to a corresponding steering input signal 42. Controller 40, in response to the status of steering input signal 42, provides steering control signals 44 to one or more powertrain modules 10 relating to the position of corresponding steering knuckles 30. A steering actuator 50 (such as a servomotor) of each powertrain module 10 responds to steering control signals 44 to adjust the position of steering knuckle 30, thereby effecting steering control of electric vehicle 34. In some embodiments of the present invention powertrain modules 10 may be operated to provide two-wheel steering wherein the knuckles 30 of either the front powertrain modules 10 or the rear powertrain modules are positionable by corresponding actuators 50 to provide steering for electric vehicle 34. In other embodiments knuckles 30 of all four powertrain modules 10 are positionable by corresponding actuators 50 to provide all-wheel steering for electric vehicle 34.

As previously noted, one or more powertrain modules 10 may be attached to vehicle 34. Example configurations include a single powertrain module 10 attached to a corner portion 38, front wheel drive wherein powertrain modules are attached to each of the two front corner portions 38, rear wheel drive wherein powertrain modules are attached to each of the two rear corner portions 38, and all-wheel drive wherein a powertrain module is attached to each of the four corner portions 38 of the vehicle.

In some embodiments powertrain module 10 may be part of a hybrid powertrain wherein at least some of the wheels of a vehicle are powered by other than electrical means. As a non-limiting example, an internal combustion engine and an associated powertrain may be coupled to one or more powertrain modules 10 to cooperatively power one or more wheels of the vehicle.

Vehicle 34 may be embodied as any type of vehicle including, without limitation, a passenger vehicle, truck, golf cart, forklift, skid-steer, and motorcycle. Further, various models and styles of vehicle 34 may be efficiently developed using powertrain module 10 as a common component, reducing or eliminating the need to custom-develop powertrain and suspension configurations.

While this invention has been shown and described with respect to a detailed embodiment thereof, it will be understood by those skilled in the art that changes in form and detail thereof may be made without departing from the scope of the claims of the invention.

What is claimed is:

1. A self-contained, detachable powertrain module for a vehicle having a planar, generally vertically oriented powertrain module mounting surface, the powertrain module comprising:

a detachable support member shaped to form a portion of an exterior body of the vehicle, the support member including a planar, generally vertically oriented support member mounting surface;

a mounting portion extending generally horizontally from the support member mounting surface and terminating in an electrical connector;

an energy source disposed within the support member;

a wheel rotatably attached to the support member; and an electric motor within the wheel, the electric motor being energized by the energy source to generate motive force, said motive force being transmitted to the wheel, the support member mounting surface of the powertrain module being facially adjacent the powertrain module mounting surface of the vehicle when the powertrain module is coupled to the vehicle, and the mounting portion of the powertrain module being selectably received by a single receptacle disposed within exterior body of the vehicle, thereby selectably both mechanically and electrically coupling the powertrain module to the vehicle as a single connection, the powertrain module being a selectably detachable fender portion of the exterior body of the vehicle and also providing motive power to the vehicle.

2. The powertrain module of claim 1, further comprising a suspension coupled between the support member and the wheel.

3. The powertrain module of claim 2, further comprising a steering knuckle coupled between the suspension and the wheel.

4. The powertrain module of claim 1 wherein the electric motor additionally functions as a regenerative brake.

5. The powertrain module of claim 1 wherein the energy source comprises at least one of a battery and a photovoltaic cell.

6. A plurality of self-contained, detachable powertrain modules for a vehicle having a plurality of planar, generally vertically oriented powertrain module mounting surfaces, each powertrain module comprising:

a detachable support member shaped to form a portion of an exterior body of the vehicle, the support member including a planar, generally vertically oriented support member mounting surface;

a mounting portion extending generally horizontally from the support member mounting surface and terminating in an electrical connector;

an energy source disposed within the support member;

a wheel rotatably attached to the support member; and an electric motor within the wheel, the electric motor being energized by the energy source to generate motive force, said motive force being transmitted to the wheel, the support member mounting surface of each powertrain module being facially adjacent a corresponding powertrain module mounting surface of the vehicle when each powertrain module is coupled to the vehicle, and the mounting portion of each powertrain module each being respectively selectably received by a single one of a group of corresponding receptacles disposed within the exterior body of the vehicle, thereby selectably both mechanically and electrically coupling each of the powertrain modules to the vehicle as a single connection for each corresponding powertrain module, a controller of the vehicle being electrically coupled to the powertrain modules by means of the mounting portions to control operation of the powertrain modules in a cooperative manner, and the powertrain modules each being selectably detachable fender portions of the exterior body of the vehicle and also providing motive power to the vehicle.

7. The plurality of powertrain modules of claim 6 wherein the controller additionally causes power from the energy sources to be coupled to each electric motor such that each wheel rotates to move the vehicle one of a forward and a reverse direction.

8. The plurality of powertrain modules of claim 6 wherein the controller additionally electrically disconnects one or more electric motors from the corresponding energy source for the one or more electric motors under predetermined conditions to reduce the amount of energy consumed by the electric vehicle.

9. The plurality of powertrain modules of claim 6 wherein the controller additionally functions as a traction control system to sense a loss of traction at one or more wheels and compensate for the loss of traction by commanding an increased amount of motor torque at the other wheels.

10. The plurality of powertrain modules of claim 6 wherein the controller additionally causes the electric motor of one or more powertrain modules to act as a regenerative brake to slow or stop the vehicle and supply generated electrical energy to the energy source.

11. The plurality of powertrain modules of claim 6 wherein the controller additionally functions as at least one of an anti-lock brake and a dynamic stability control wherein the amount of torque produced by each powertrain module is adjusted to minimize over steer or under steer of the vehicle through corners and maintain acceleration by preventing wheel spin on surfaces with uneven grip.

12. The plurality of powertrain modules of claim 6 wherein the controller additionally functions as a power grid controller, transferring power between energy sources of the powertrain modules.

13. The plurality of powertrain modules of claim 6 wherein the controller additionally functions as a steering controller, receiving steering input signals from a steering device and generating corresponding steering control signals that are coupled to steering actuators on the powertrain modules to control the position of corresponding steering knuckles.

14. A self-contained, detachable powertrain module for a vehicle having a planar, generally vertically oriented powertrain module mounting surface, the powertrain module comprising:

a detachable support member shaped to form a portion of an exterior body of the vehicle, the support member including a planar, generally vertically oriented support member mounting surface;

a mounting portion extending generally horizontally from the support member mounting surface and terminating in an electrical connector;

an energy source disposed within the support member;

a suspension pivotably coupled to the support member;

a wheel rotatably attached to the suspension; and an electric motor within the wheel, the electric motor being energized by the energy source to generate motive force, said motive force being transmitted to the wheel, the support member mounting surface of the powertrain module being facially adjacent the powertrain module mounting surface of the vehicle when the powertrain module is coupled to the vehicle, and the mounting portion of the powertrain module being selectably received by a single receptacle disposed within the exterior body of the vehicle, thereby selectably both mechanically and electrically coupling the powertrain module to the vehicle as a single connection, the powertrain module being a selectably detachable fender portion of the exterior body of the vehicle and also providing motive power to the vehicle.

15. The powertrain module of claim 14, further comprising a steering knuckle coupled between the suspension and the wheel.

16. The powertrain module of claim 14 wherein the electric motor additionally functions as a regenerative brake.

17. A method for constructing a self-contained, detachable powertrain module for a vehicle having a planar, generally vertically oriented powertrain module mounting surface, comprising the steps of:

fabricating a detachable support member shaped to form a portion of an exterior body of the vehicle, the support member including a planar, generally vertically oriented support member mounting surface;

extending a mounting portion generally horizontally from the support member mounting surface and terminating the mounting portion in an electrical connector;

installing an energy source within the support member;

rotatably attaching a wheel to the support member;

mounting an electric motor within the wheel;

selectably energizing the electric motor with the energy source to generate a motive force; and transmitting the motive force of the motor to the wheel, the support member mounting surface of the powertrain module being facially adjacent the powertrain module mounting surface of the vehicle when the powertrain module is coupled to the vehicle, and the mounting portion of the powertrain module being selectably received by a single receptacle disposed within the exterior body of the vehicle, thereby selectably both mechanically and electrically coupling the powertrain module to the vehicle as a single connection, the powertrain module being a selectably detachable fender portion of the exterior body of the vehicle and also providing motive power to the vehicle.

18. The method of claim 17, further comprising the step of coupling a suspension between the support member and the wheel.

19. The method of claim 18, further comprising the step of coupling a steering knuckle between the suspension and the wheel.

20. The method of claim 17, further comprising the step of additionally utilizing the electric motor as a regenerative brake.

* * * * *

UNITED STATES PATENT AND TRADEMARK OFFICE
CERTIFICATE OF CORRECTION

PATENT NO. : 7,849,945 B2  Page 1 of 1
APPLICATION NO. : 11/361556
DATED : December 14, 2010
INVENTOR(S) : Edwin Stuart Ross et al.

It is certified that error appears in the above-identified patent and that said Letters Patent is hereby corrected as shown below:

Column 3, line 24, "(Liuon)" should read --(LiIon)--

Signed and Sealed this
Eighth Day of March, 2011

David J. Kappos
*Director of the United States Patent and Trademark Office*